United States Patent
Neufeld et al.

(10) Patent No.: US 7,882,522 B2
(45) Date of Patent: Feb. 1, 2011

(54) DETERMINING USER INTEREST BASED ON GUIDE NAVIGATION

(75) Inventors: Nadav Neufeld, Redmond, WA (US); Dana Rao, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 384 days.

(21) Appl. No.: 11/564,721

(22) Filed: Nov. 29, 2006

(65) Prior Publication Data
US 2008/0127262 A1   May 29, 2008

(51) Int. Cl.
*H04N 7/16* (2006.01)
(52) U.S. Cl. .......................................... 725/40; 715/738
(58) Field of Classification Search ............... 725/37–61
See application file for complete search history.

(56) References Cited

U.S. PATENT DOCUMENTS

| | | | |
|---|---|---|---|
| 6,718,551 B1 | 4/2004 | Swix et al. | |
| 6,756,997 B1 | 6/2004 | Ward, III et al. | |
| 6,978,470 B2 | 12/2005 | Swix et al. | |
| 7,003,792 B1 * | 2/2006 | Yuen | 725/46 |
| 7,426,696 B1 * | 9/2008 | Hwang et al. | 715/784 |
| 2002/0083451 A1 | 6/2002 | Gill et al. | |
| 2002/0123928 A1 | 9/2002 | Eldering et al. | |
| 2002/0129368 A1 | 9/2002 | Schlack et al. | |
| 2002/0178447 A1 | 11/2002 | Plotnick et al. | |
| 2003/0079227 A1 * | 4/2003 | Knowles et al. | 725/50 |
| 2003/0110499 A1 * | 6/2003 | Knudson et al. | 725/42 |
| 2003/0149975 A1 | 8/2003 | Eldering et al. | |
| 2004/0031058 A1 * | 2/2004 | Reisman | 725/112 |
| 2005/0283796 A1 | 12/2005 | Flickinger | |
| 2005/0283797 A1 | 12/2005 | Eldering et al. | |
| 2008/0127266 A1 * | 5/2008 | Ward et al. | 725/42 |

FOREIGN PATENT DOCUMENTS

WO   WO0237297   5/2002

OTHER PUBLICATIONS

Mark Claypool et al., Inferring User Interest, Aug. 31, 2001, Computer Science Department Worcester Polytechnic Institute, pp. 1-17.*

(Continued)

*Primary Examiner*—Andrew Y Koenig
*Assistant Examiner*—Alfonso Castro
(74) *Attorney, Agent, or Firm*—Lee & Hayes, PLLC

(57) ABSTRACT

An electronic program guide (EPG) application is configured to render a program listing, a currently indicated program, and additional data. The EPG application is further configured to automatically determine, based on user-submitted EPG navigation commands, whether or not the user is likely interested in the currently indicated program. If it is determined that the user is likely interested in the currently indicated program, then the additional data that is displayed along with the program listing is detailed data associated with the currently indicated program. In contrast, if it is determined that the user is likely not interested in the currently indicated program, then instead of detailed data associated with the currently indicated program, the additional data that is displayed along with the program listing is content that is targeted to the user.

17 Claims, 10 Drawing Sheets

OTHER PUBLICATIONS

Adams et al., "Interactive Television: Coming Soon to a Screen Near You", 31 pages, No Date Provided.

"Electronic Retailing & eMarketing", NEWSLETTER HERMES, Digital TV and Interactive Advertisement, Issue No. 10, Jun.-Jul. 2001, 4 pages.

Eronen, "User Centered Design of New and Novel Products: Case Digital Television", Publications in Telecommunications Software and Multimedia, Espoo, 2004, 110 pages.

"TV That Watches You: The Prying Eyes of Interactive Television", A Report by the Center for Digital Democracy, Jun. 2001, 30 pages.

* cited by examiner

Mickey and Friends
...plot description...
...rating...

Current Time: 1:14 PM

CURRENTLY
HIGHLIGHTED PROGRAM

"MICKEY AND FRIENDS"

Press Select to Tune to This Showing

| APRIL 19 | 1:00 PM | 1:30 PM | 2:00 PM | 2:30 PM | 3:00 PM | 3:30 PM |
|---|---|---|---|---|---|---|
| 37 FOX | <<Perry Mason | MLB – Houston at Atlanta | | | | |
| 38 ESPN | MLB – Seattle at Oakland | | | | | |
| 39 KHQ | Days of Our Lives | | Passions | | Rosie O'Donnel | |
| 40 DSNY | Mickey and Friends | | Beauty and the Beast | | | |
| 41 NICK | Rocko's Modern Life | The Angry Beavers | The Wild Thornberrys | Rocket Power | Spongebob Squarepants | The Fairly OddParents |
| 42 PPV | Shrek | | | Atlantis: The Lost Empire | | |
| 43 KREM | As the World Turns | | Guilding Light | | Ananda Lewis | |
| 44 KAYU | Texas Justice | Paid Programming | Paid Programming | Garfield | Magic Schoolbus | Sister, Sister |
| 45 KXLY | One Life to Live | | General Hospital | | Port Charles | Maury |
| 46 GOVACC | <<Government Access Programming>> | | | | | |
| 47 NBC | Days of Our Lives | | Passions | | Rosie O'Donnel | |
| 48 KSPS | Terry Madden Watercolor | Kaye's Quilting Friends | Caillou | Sagwa, the Chinese Siamese Cat | Mister Rogers' Neighborhood | Arthur |
| 49 KGPX | Bonanza | | Bonanza | | Promised Land | |
| 50 TDC | Home Matters | | Christopher Lowell | | Christopher Lowell | |

DETERMINING USER INTEREST BASED ON GUIDE NAVIGATION

BACKGROUND

Many media entertainment systems, such as IP-based, cable, or satellite television networks, broadcast media content over hundreds of channels. Many of these entertainment systems provide electronic program guides (EPGs) that allow users to browse and in some instances, interactively select, programs in which they are interested. With hundreds of channels available, finding a particular program of interest can be a daunting task.

Many EPGs are interactive and designed to simultaneously provide minimal information (e.g., a title and scheduled broadcast time) for many programs and more detailed information (e.g., plot summary, rating, video clip, etc.) for a single, currently indicated program. Providing a video clip via a small picture-in-picture (PIP) window along with the EPG data provides the viewer with additional information associated with a currently indicated program.

However, while a user is interacting with an EPG, depending on how the user navigates the EPG, a currently indicated program may not be of interest to the user. For example, a user may successively page down to quickly scroll through the EPG, reading through a vertical list of programs currently scheduled for broadcast. In this scenario, presenting a video clip associated with the currently indicated program may not be useful to the user.

SUMMARY

This summary is provided to introduce simplified concepts of determining user interest based on guide navigation, which is further described below in the Detailed Description. This summary is not intended to identify essential features of the claimed subject matter, nor is it intended for use in determining the scope of the claimed subject matter.

In an exemplary embodiment of determining user interest based on guide navigation, electronic program guide (EPG) navigation commands submitted by a user are analyzed to determine whether or not the user is likely interested in a currently highlighted program. For example, arrow commands that move a program indicator from one cell to an adjacent cell in an EPG grid may be interpreted to indicate that the user is likely interested in the currently highlighted program. In contrast, successive page up or page down commands may be interpreted to indicate that the user is quickly scanning through the EPG grid, and is not likely interested in the currently highlighted program.

If it is determined that the user is likely interested in the currently highlighted program, then detailed data associated with the currently highlighted program (e.g., plot summary, rating, video clip, etc.) is displayed along with the EPG grid. However, if it is determined that the user is likely not interested in the currently highlighted program, then alternate, targeted content is displayed along with the EPG grid. The targeted content may include, for example, an advertisement, promotional video clip, on-demand preview, pay-per-view preview, and so on. The targeted content to be displayed may be selected based on any number factors which may include, but are not limited to, a channel band associated with the currently highlighted program, a channel associated with the currently highlighted program, user profile data (e.g., demographics), user viewing history data, user pay-per-view purchase history, user on-demand programming history, and so on.

BRIEF DESCRIPTION OF THE DRAWINGS

The same numbers are used throughout the drawings to reference like features and components.

FIG. 1 is a pictorial diagram that illustrates an exemplary electronic program guide display in which a program scheduled for current broadcast is indicated.

DETAILED DESCRIPTION

Electronic program guide applications typically provide a grid (or other similar layout) for displaying identifiers associated with many programs available to a viewer (e.g., programs scheduled for broadcast, scheduled pay-per-view programs, on-demand programs, and so on). Along with the grid, an exemplary electronic program guide application may also provide a details area that may include a picture-in-picture (PIP) window. The details area, including the PIP window, is typically configured to display additional, more detailed information associated with a program currently indicated in the grid. At times, however, it may be more appropriate to display targeted content to the user instead of the more detailed data associated with the program currently indicated in the grid.

FIG. 1 illustrates an exemplary electronic program guide (EPG) display 100 in which a program scheduled for current broadcast is indicated. Exemplary EPG display 100 includes a grid area 102 for displaying programs that are scheduled for broadcast and/or content that is available on-demand. In the illustrated example, the grid is arranged by time along a horizontal axis and by channel along a vertical axis. It is recognized that the illustrated EPG display is merely one example, and any number of configurations may be used to display such information to a user. Exemplary EPG display 100 also includes a details area 104 for displaying additional details associated with a program that is currently highlighted (or otherwise indicated) in grid area 102. In the illustrated example, the program, "Mickey and Friends" 106 is currently highlighted in grid area 102. Accordingly, additional information associated with "Mickey and Friends" (e.g., a plot description, a rating, etc.) is shown in details area 104. Details area 104 also includes a picture-in-picture (PIP) window 108, in which video content (or a still image) may be displayed. In the illustrated example, when the program that is currently highlighted in grid area 102 is a program that is currently being broadcast, PIP window 108 displays the highlighted program as it is currently being broadcast.

Figure 2:
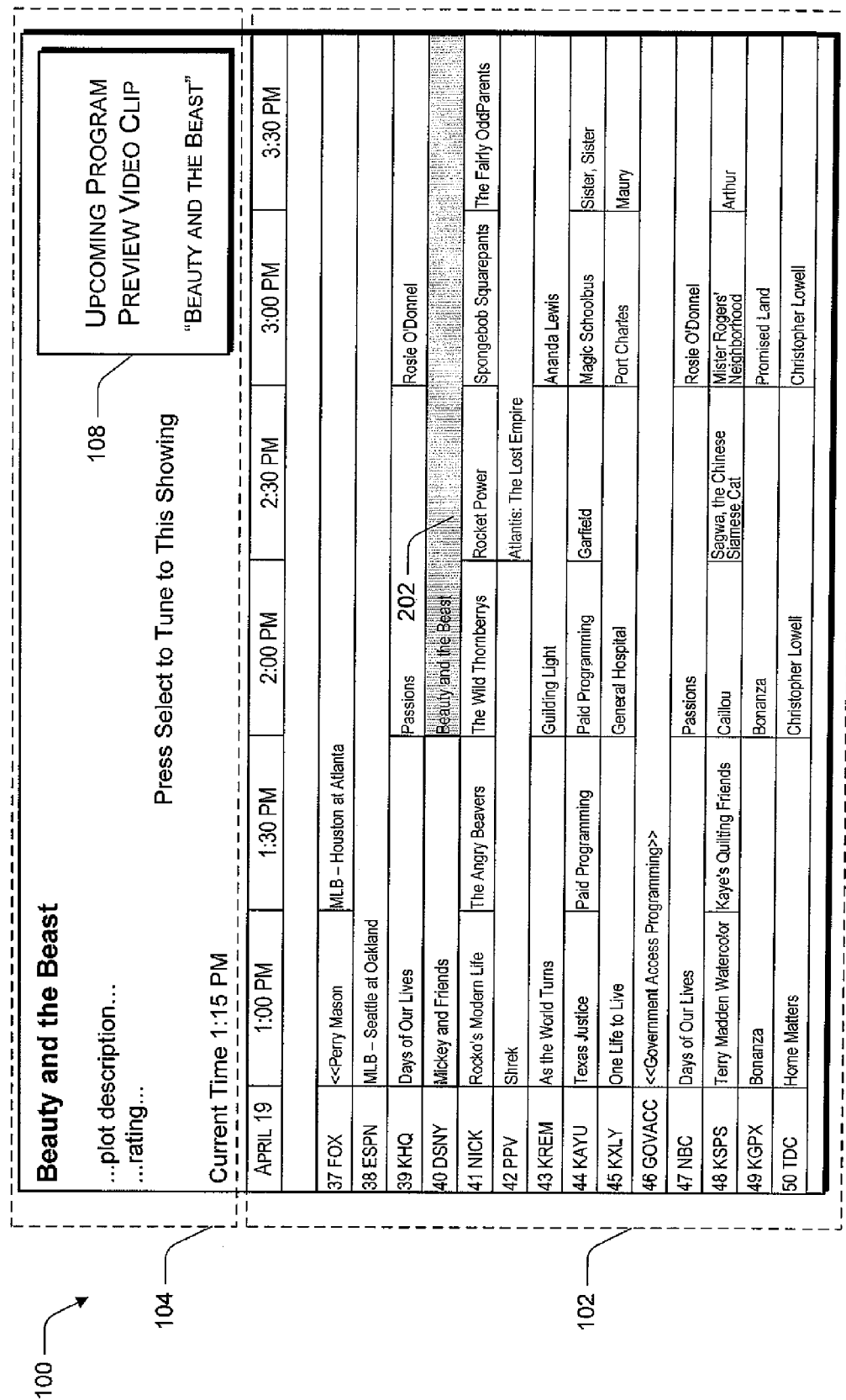
FIG. 2 is a pictorial diagram that illustrates an exemplary electronic program guide display in which a program scheduled for future broadcast is indicated.

FIG. 2 illustrates an exemplary electronic program guide display 100 in which a program scheduled for future broadcast is currently indicated. As described above with reference to FIG. 1, exemplary EPG display 100 includes a grid area 102, details area 104, and PIP window 108. In the illustrated example, the program, "Beauty and the Beast" 202 is currently highlighted in grid area 102. Accordingly, additional information associated with "Beauty and the Beast" (e.g., a plot description, a rating, etc.) is shown in details area 104. In the illustrated example, the program that is currently highlighted in grid area 102 is a program that is scheduled for a future broadcast. Accordingly, PIP window 108 displays a preview video clip associated with the highlighted program. In an exemplary implementation, PIP window 108 also displays a preview video clip associated with the highlighted program if the highlighted program is available on-demand.

FIGS. 1 and 2 both illustrate implementations in which the data presented in details area 104 and PIP window 108 is based on an assumption that the user is interested in the program that is currently highlighted in grid area 102. It is likely, however, in some situations, that this assumption is incorrect. For example, a user may sit down to watch television, but may not know what programs are currently being broadcast that may interest him or her. In such a scenario, the user may repeatedly enter a page-down or page-up command to quickly scroll through the grid showing the programs currently being broadcast. In this way, the user is able to quickly scan pages of listings in an attempt to locate something of interest. When the user identifies a particular program that may be of interest, the user may then enter a series of up and/or down commands to move the program indicator to the identified program in order to view more detailed information about the program in details area 104.

While the user is paging through the EPG, it may be appropriate to assume that the user is quickly scanning the program listings, and that the currently highlighted program is not necessarily of any interest to the user. Accordingly, displaying detailed information about the currently highlighted program in details area 104 does not provide the user with useful information. As such, while the user is paging (or otherwise quickly scanning) through the EPG, it is more appropriate to display in details area 104, other data that is more likely to be of interest to the user.

Figure 3:
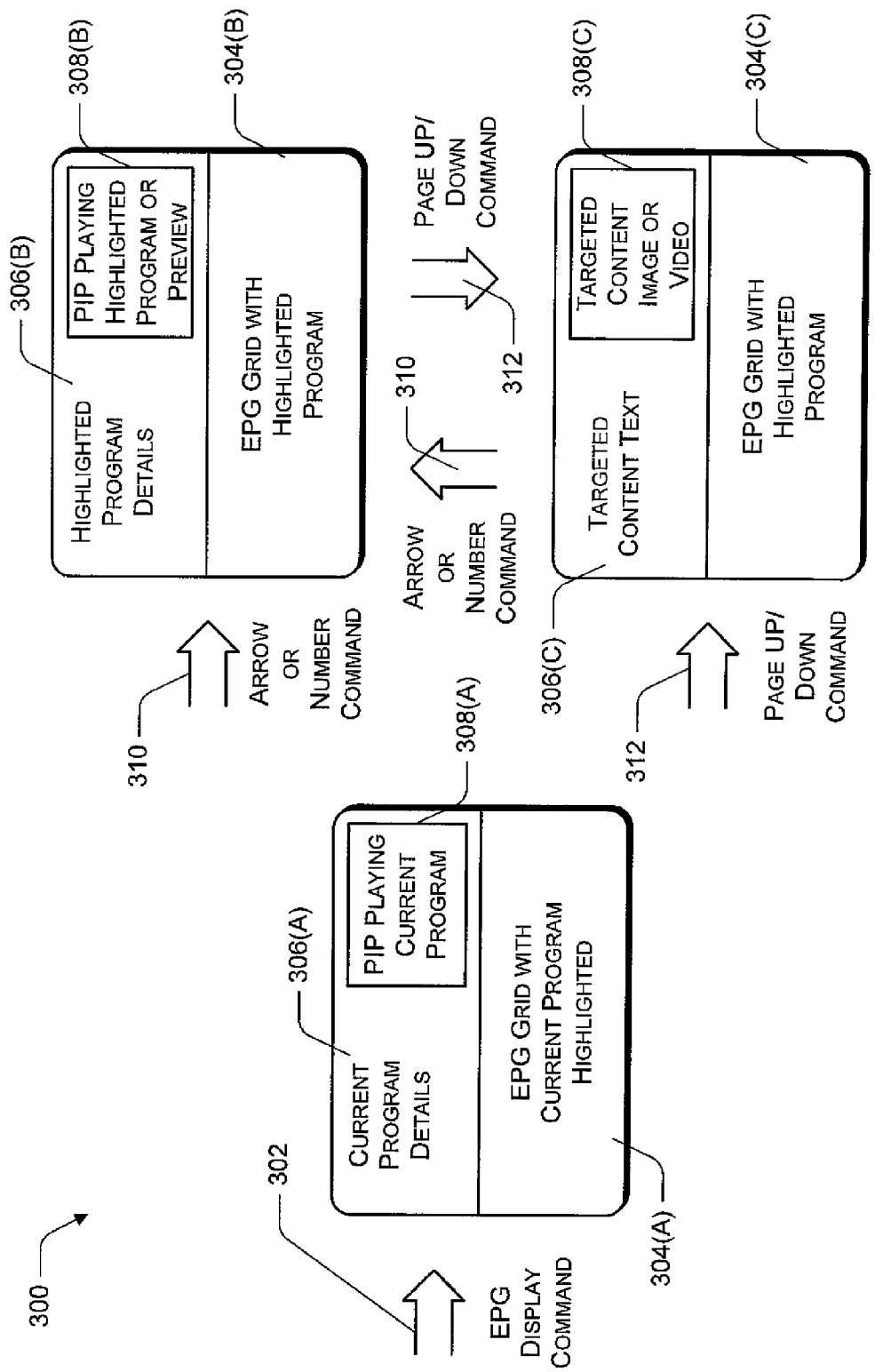
FIG. 3 is a block diagram that illustrates exemplary display of targeted content in response to determining user interest based on guide navigation.

FIG. 3 is a block diagram 300 that illustrates exemplary display of targeted content in response to determining user interest based on guide navigation. In the illustrated example, an EPG is launched when an EPG display command 302 is received. When the EPG is launched, the program that is currently being broadcast on the currently tuned channel is indicated in the EPG grid 304(A). As described above with reference to FIG. 1, details about the current program are displayed in details area 306(A), and the program, as it is currently being broadcast, is displayed in PIP window 308(A). Once the EPG has been launched, if the user enters an arrow or number command 310 (e.g., the user presses an up arrow button, down arrow button, left arrow button, right arrow button, or number button(s) designating a specific channel number), the cell indicator in the EPG grid 304(B) moves to the appropriate cell based on the received command. In an exemplary implementation, given an arrow or number command, it is assumed that the user has some degree of interest in the newly highlighted program. Accordingly, as described above with reference to FIGS. 1 and 2, additional details associated with the currently highlighted program are displayed in details area 306(B), and PIP window 308(B) displays the program as it is currently being broadcast (for a program currently being broadcast) or a preview of the program (for an on-demand program or a program scheduled for a future broadcast).

If the user enters page down or page up command 312, the cell indicator in the EPG grid 304(C) moves to the appropriate cell based on the received command (e.g., the first cell in the current column on the next page or the last cell in the current column on the previous page, respectively). In an exemplary implementation, a page up or page down command 312 is interpreted as an indication that the user is scanning through the EPG grid, and is likely not interested in the currently highlighted program. Accordingly, targeted content is displayed in details area 306(C), and PIP window 308(C). In an alternate implementation, details associated with the currently highlighted program may be displayed in details area 306(C) while targeted content is displayed in PIP window 308(C). Alternatively, targeted content may be displayed in details area 306(C) while the currently highlighted program or a preview of the currently highlighted program is displayed in PIP window 308(C).

In an exemplary implementation, if the user subsequently enters an arrow or number command 310, it is assumed that the user has identified a program that may be of interest. Accordingly, program details associated with the highlighted program are displayed in details area 306(B) and the highlighted program or a preview of the highlighted program is displayed in PIP window 308(B).

Content to be targeted to the user in details area 306(C) and/or PIP window 308(C) may be determined in any number of ways. For example, because it is being assumed that the user is scrolling through the EPG in search of a program of interest, the targeted content may include previews and/or advertisements for programs that are currently available on demand. Similarly, the targeted content may include previews and/or advertisements for upcoming pay-per-view programs. Alternatively, the targeted content may include advertisements for products, services, channels, or programs that may be of interest to the user based, for example, on user profile data (e.g., demographics, viewing history, pay-per-view purchase history, etc.). The targeted content may also have any number and/or combination of formats, such as, but not limited to, video, audio, text, still image, and so on.

Figure 4:
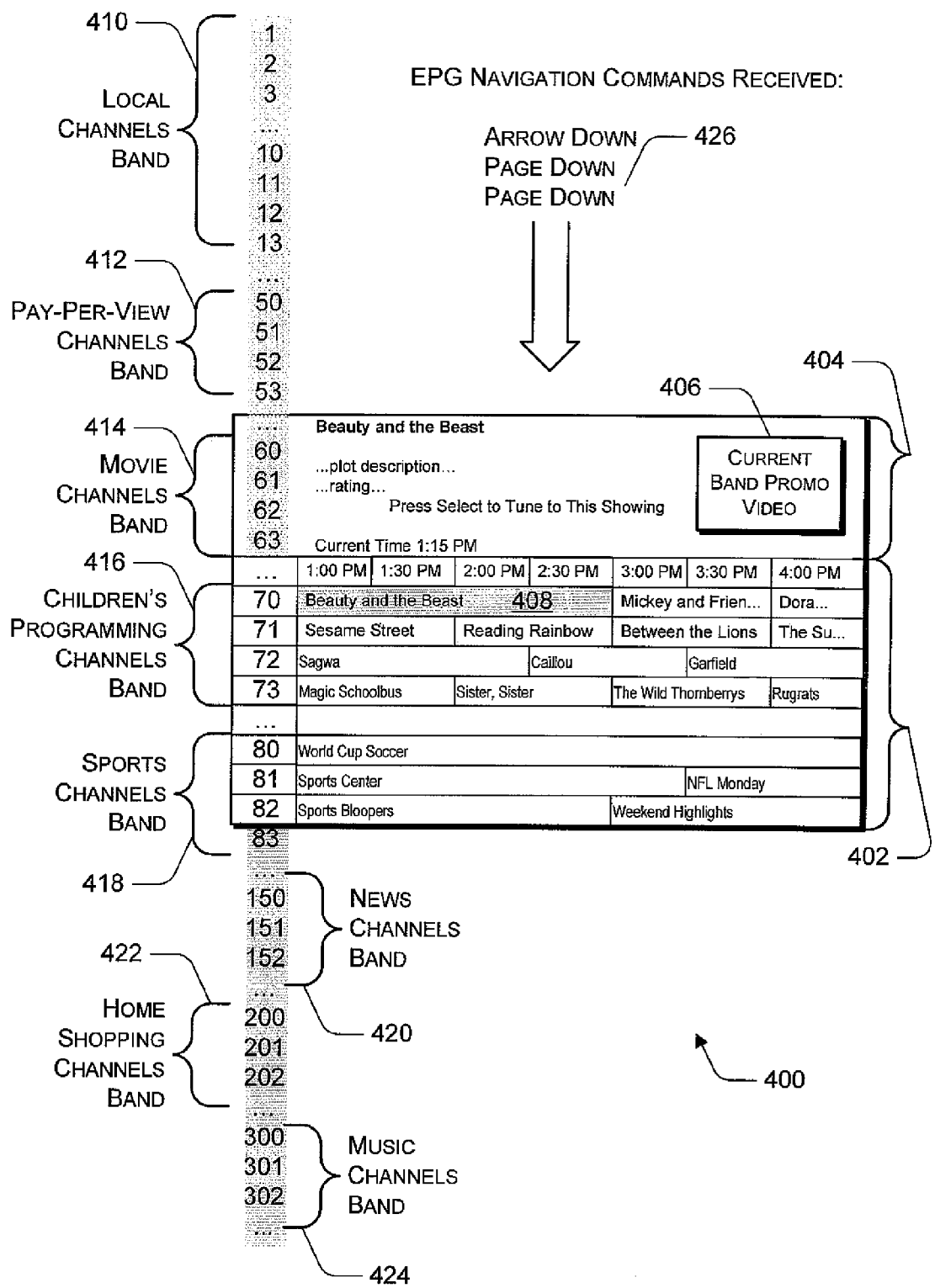
FIG. 4 is a pictorial diagram that illustrates an exemplary electronic program guide display in which targeted content is selected for display based on a channel band associated with a currently indicated program.

FIG. 4 illustrates an exemplary electronic program guide display 400 in which targeted content is selected for display based on a channel band associated with a currently indicated program. Exemplary EPG display 400 includes a grid area 402, details area 404, and PIP window 406. In the illustrated example, the program, "Beauty and the Beast" 308 is currently highlighted in grid area 402. Accordingly, additional information associated with "Beauty and the Beast" (e.g., a plot description, a rating, etc.) is shown in details area 404. In the illustrated example, the listing of channels presented in the grid area 402 is arranged according to the type of programming typically shown on each channel. For example, a local channels band 410 includes those channels that provide local programming; a pay-per-view channels band 412 includes those channels via which pay-per-view programming is available; a movie channels band 414 includes those channels that are dedicated to movies; a children's programming channels band 416 includes those channels that are dedicated to children's programs; a sports channels band 418 includes those channels that are dedicated to sports programs; a news channels band 420 includes those channels that are dedicated to news programs; a home shopping channels band 422 includes those channels that are dedicated to home shopping programs; and a music channels band 424 includes those channels that are dedicated to music programs. As described above with reference to FIG. 3, as a user browses through program data presented in the EPG 400, EPG navigation commands 426 are received. In the illustrated example, the received navigation commands include an arrow down command followed by two page-down commands. As described above, in an exemplary implementation, a page down command implies that a user is paging through listed programs. As such, the currently highlighted program is not necessarily a program of interest to the user. However, in an exemplary implementation, it may be assumed that the user is interested in programs that are similar to the currently highlighted program (e.g., programming that falls within the same channel band). Accordingly, based on an analysis of the received EPG navigation commands, PIP window 406 displays a promotional video associated with the current channel band. For example, if the program that is currently selected in grid area 402 is within the children's programming channels band 416, PIP window 406 displays a video promoting programs available on channels within the children's programming channels band 416. Alternatively, the PIP window 406 may display an advertisement (e.g., for a children's toy or other product) targeted to a demographic of individuals typically interested in programs available via the current channels band.

Figure 5:
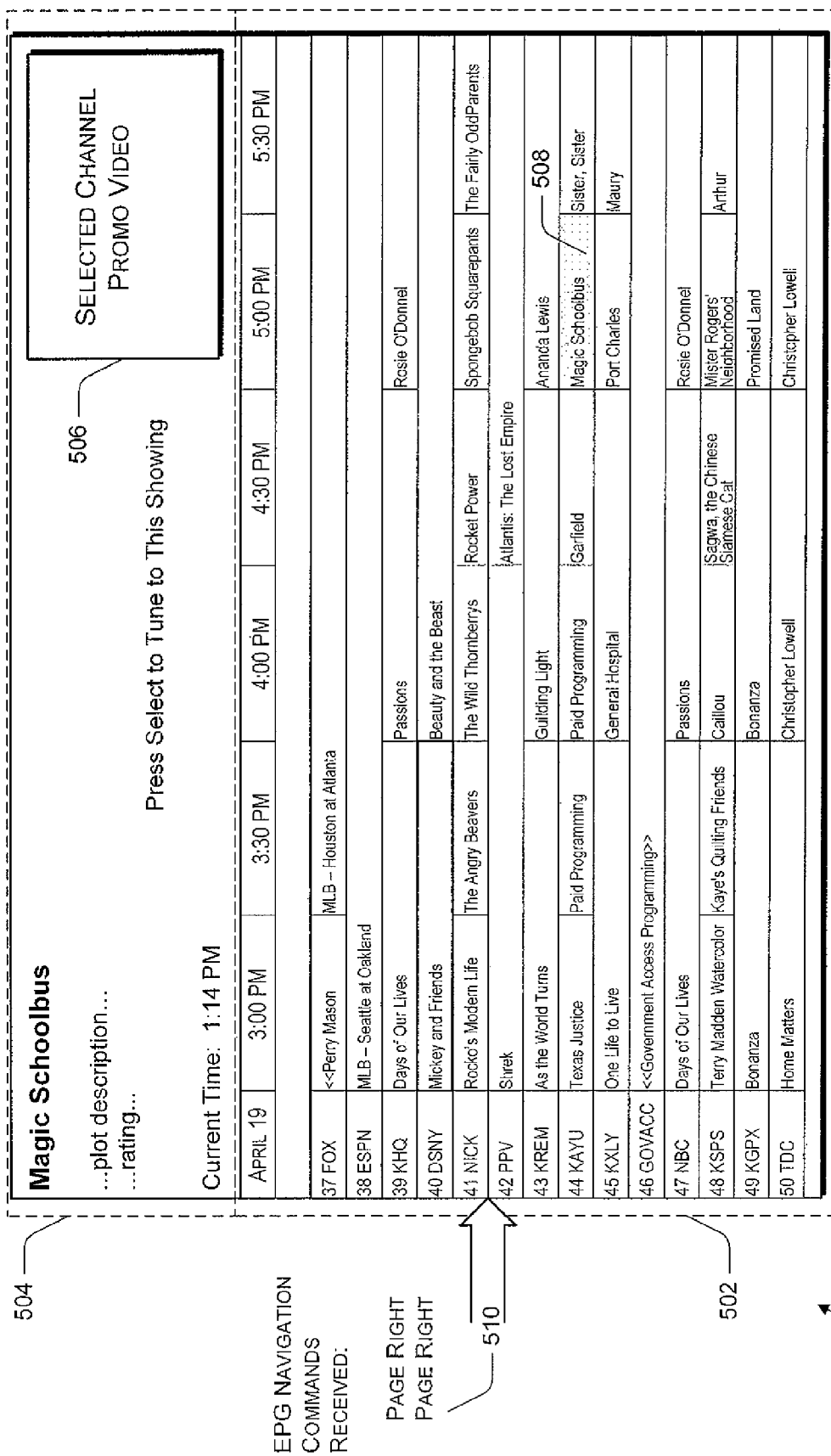
FIG. 5 is a pictorial diagram that illustrates an exemplary electronic program guide display in which targeted content is selected for display based on a channel associated with a currently indicated program.

FIG. 5 illustrates an exemplary electronic program guide display 500 in which targeted content is selected for display based on a channel associated with a currently indicated program. Exemplary EPG display 500 includes a grid area 502, details area 504, and PIP window 506. In the illustrated example, the program, "Magic Schoolbus" 508 is currently highlighted in grid area 502. Accordingly, additional information (e.g., a plot description, a rating, etc.) associated with "Magic Schoolbus" is shown in details area 504. As a user browses through program data presented in the EPG 500, EPG navigation commands 510 are received. In the illustrated example, the received navigation commands include two successive page right commands. In an exemplary implementation, a page right or page left command is evaluated similarly to a page up or a page down command, indicating that a user is browsing through the EPG, and may not be interested in the currently highlighted program. In the illustrated exemplary implementation, based on an analysis of the received navigation commands, PIP window 506 displays a promotional video associated with the channel via which the currently highlighted program is available. For example, if the program that is currently selected in grid area 502 is scheduled for broadcast on ESPN, PIP window 506 displays a promotional video associated with ESPN. Alternatively, the PIP window 506 may display an advertisement (e.g., for a sports drink or other product) targeted to a demographic of individuals typically interested in the current channel.

Figure 6:
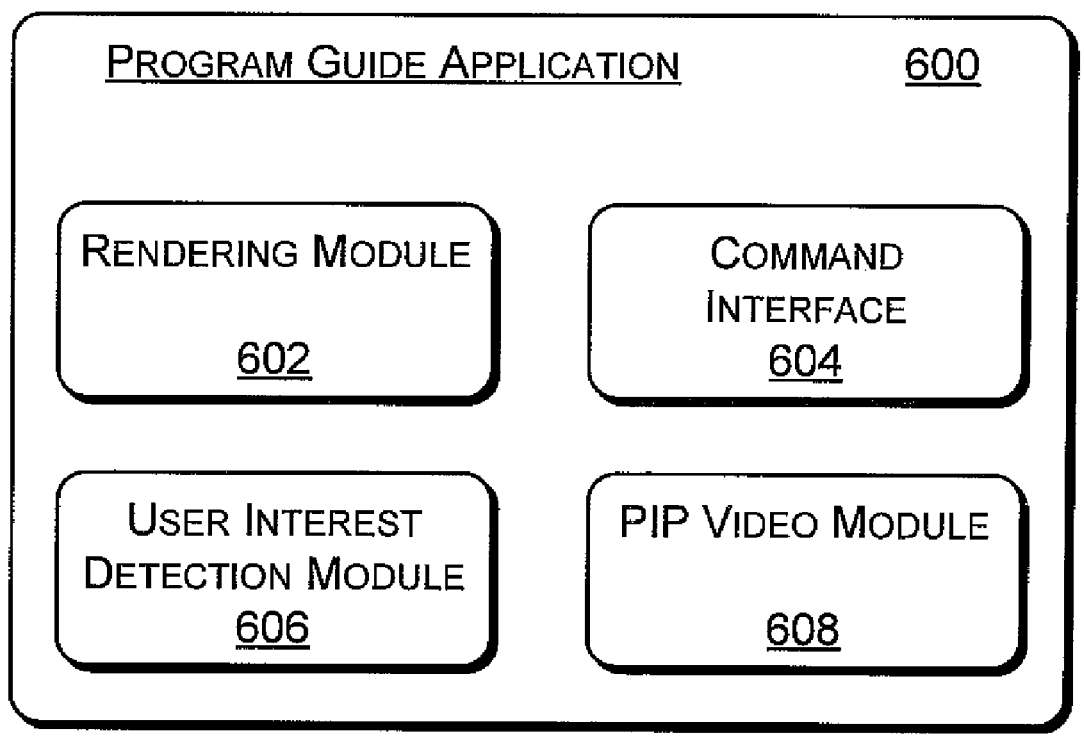
FIG. 6 is a block diagram that illustrates select components of an exemplary program guide application configured to determine user interest based on guide navigation.

FIG. 6 illustrates select components of an exemplary program guide application 600 configured to determine user interest based on guide navigation. Exemplary program guide application 600 includes rendering module 602, command interface 604, user interest detection module 606, and PIP video module 608.

Rendering module 602 is configured to render a graphical representation of electronic program guide data. Examples of EPG renderings are illustrated in FIGS. 1-5. As stated above, those examples illustrated in FIGS. 1-5 are merely examples, and it is recognized that EPG data may be rendered according to any number of arrangements and/or formats.

Command interface 604 is configured to receive user-submitted commands, and to direct rendering module 602 to alter the rendered graphical representation of the electronic program guide data based on the received commands. For example, a first command (e.g., submitted by pressing a guide button on a remote control device) causes the EPG guide to be rendered; a down arrow command may cause a selection indicator (e.g., a highlighted cell) to move down one position within a rendered EPG grid; an up arrow command may cause the selection indicator to move up one position within the rendered EPG grid; a page down command may cause the selection indicator to move down to the first position on the next page of the rendered EPG grid; a page up command may cause the selection indicator to move up to the last position on the previous page of the rendered EPG grid; a right arrow command may cause the selection indicator to move one position to the right within the rendered EPG grid; a left arrow command may cause the selection indicator to move one position to the left within the rendered EPG grid; a page right command may cause the selection indicator to move to the first position on the next page to the right within the rendered EPG grid; and a page left command may cause the selection indicator to move to the last position on the previous page to the left within the rendered EPG grid.

User interest detection module 606 is configured to determine whether or not a user is likely interested in the currently highlighted program based on the navigation commands submitted by the user. For example, if the user slowly enters repeated down arrow commands, user interest detection module 606 may determine that the user is interested in reviewing information about each of the successively highlighted programs. In contrast, if the user enters repeated page down commands, user interest detection module 606 may determine that the user is scanning through the programs that are scheduled for broadcast at a particular time, and may not necessarily be particularly interested in the currently highlighted program. Similarly, if the user enters repeated page right commands, user interest detection module 606 may determine that the user is searching for a program that is scheduled for future broadcast on the channel associated with the currently highlighted program.

In an exemplary implementation, a single page up, page down, page right, or page left command is interpreted to indicate that the user is not interested in the currently highlighted program. As such, targeted content is displayed upon receipt of a single page up, page down, page right, or page left command. In an alternate implementation, additional analysis is performed to determine the user's likely interest (or lack thereof) in the currently indicated program. For example, user interest detection module 606 may not determine that the user is scrolling through the EPG data with no specific interest in the highlighted program until the user has entered three or more successive page commands in the same direction. It is recognized that any single command or combination of commands may be interpreted as a user's lack of particular interest, resulting in the display of targeted content.

PIP video module 608 is configured to identify appropriate media content to be rendered in a PIP window that is displayed along with the rendered program guide. Appropriate media content may be determined based on which program is currently indicated by a selection indicator within the rendered EPG grid. Alternatively, appropriate media content may be determined based on a user's interest as determined by user interest detection module 606.

Methods for determining user interest based on guide navigation may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through one or more communications networks. In a distributed computing environment, computer executable instructions may be located in both local and remote computer storage media, including memory storage devices.

Figure 7:
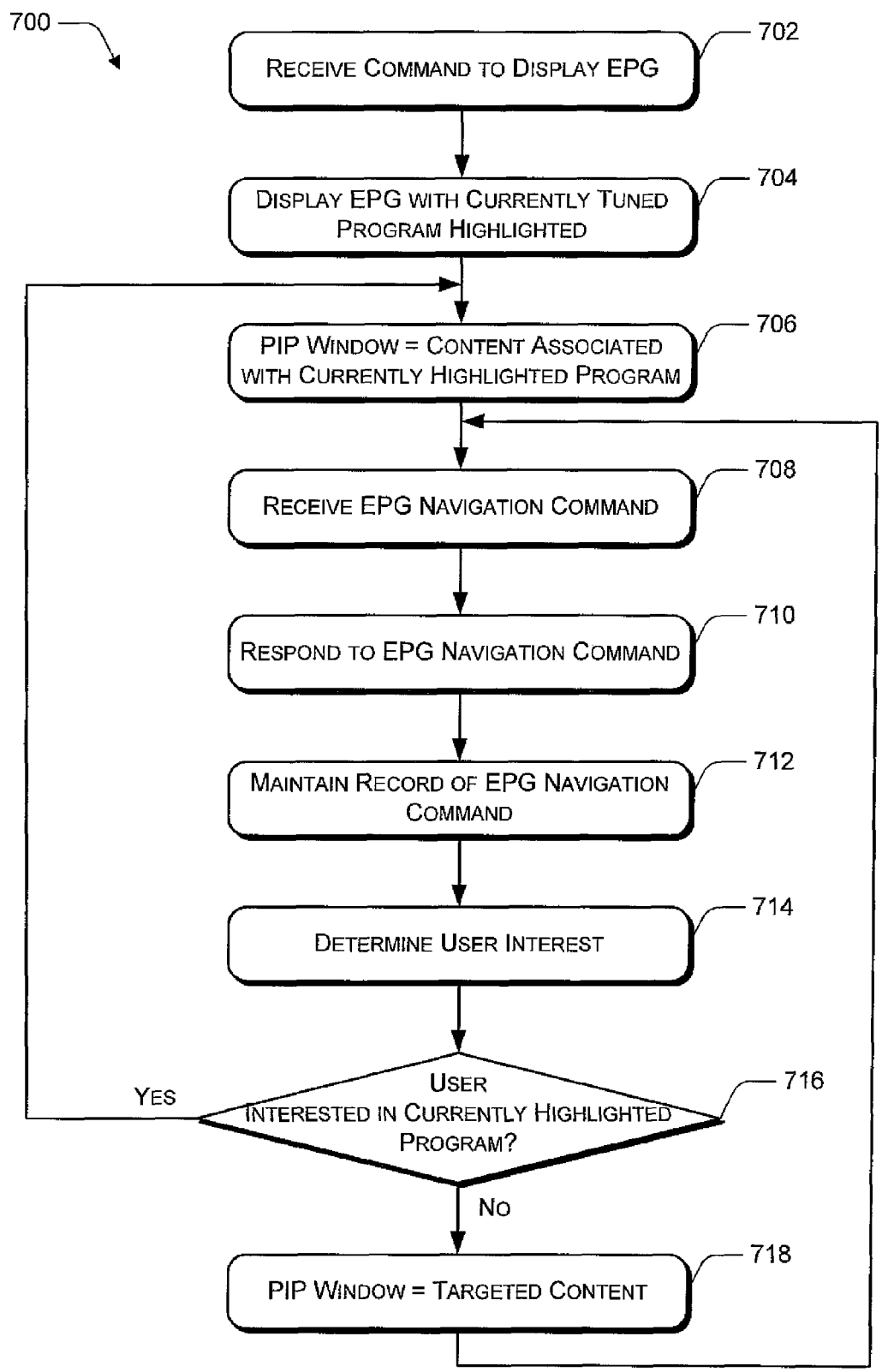
FIG. 7 is a flow diagram that illustrates an exemplary method for determining user interest based on guide navigation.

FIG. 7 illustrates an exemplary method for determining user interest based on guide navigation. FIG. 7 is a specific example of determining user interest based on guide navigation, and is not to be construed as a limitation. The order in which the method blocks are described is not intended to be construed as a limitation, and any number of the described method blocks can be combined in any order to implement the method. Furthermore, the method can be implemented in any suitable hardware, software, firmware, or combination thereof.

At block 702, a command to display an EPG is received. For example, a user may press a guide button on a remote control device, or otherwise submit a command indicating a user desire to view an EPG.

At block 704, an EPG is displayed with the currently tuned program highlighted. For example, as illustrated in FIG. 1, if "Mickey and Friends" is currently being broadcast on the currently tuned channel when the user enters a command to display the EPG, then EPG display 100 is displayed, with the current program 106 highlighted in grid area 102.

At block 706, a PIP window associated with the EPG is configured to display content associated with the currently highlighted program. For example, as illustrated in FIG. 1, PIP window 108 displays the highlighted program as it is currently being broadcast. If the currently highlighted program were not currently being broadcast (e.g., a program scheduled for future broadcast or a program available on demand), then the PIP window associated with the EPG may display a preview associated with the program.

At block 708, an EPG navigation command is received. For example, command interface 604 receives an indication that a user has pressed a navigation button on a remote control. Navigation buttons may include, for example, a series of one or more number buttons, indicating a particular channel; an up, down, right, or left arrow button; or a page up, page down, page right, or page left button.

At block 710, the received EPG navigation command is responded to. For example, command interface 604 directs rendering module 602 to modify the EPG display to reflect the navigation requested by the user.

At block 712, a record of the EPG navigation command is maintained. For example, if a user's likely lack of interest in the currently highlighted program is determined based on a series of received EPG navigation commands, then user interest detection module 606 may maintain a record of the received EPG navigation command to be used in determining the user's interest.

At block 714, an assumed user interest is determined. For example, user detection module 606 analyzes the EPG navigation command that is maintained (along with any other previously received EPG navigation commands that may have been received and maintained) to determine whether or not the user is likely interested in the currently highlighted program.

At block 716, it is determined whether or not the user is likely interested in the currently highlighted program. If it is determined that the user is likely interested in the currently highlighted program (the "Yes" branch from block 716), then processing continues as described above with reference to block 706.

If it is determined that the user is likely not interested in the currently highlighted program (the "No" branch from block 716), then at block 718, the PIP window associated with the EPG is configured to display targeted content instead of content associated with the currently highlighted program. For example, as described above with reference to FIGS. 3-5, targeted content may include, for example, advertisements, channel promotions, channel band promotions, pay-per-view previews, on-demand previews, and so on. Furthermore, the content to be displayed may be determined based on any number of factors, including, but not limited to, any combination of: user profile data, pay-per-view purchasing history, on-demand program viewing history, and/or a current location in the EPG grid. Processing then continues as described above with reference to block 708.

While aspects of the described determining user interest based on guide navigation can be implemented in any number of different computing systems, environments, television-based entertainment systems, and/or configurations, embodiments for determining user interest based on guide navigation are described in the context of the following exemplary systems and environments.

A typical household may have four, five, or more, television viewing areas and/or rooms with televisions, most of which consumers expect to have television content provided by a television programming content provider. In an IP-based television (IPTV) system, a television-based client device does not include a physical tuner like a conventional television set-top box, for example. Rather the television programming content and other media content is delivered to the household as IP-based data via a communication network.

Figure 8:
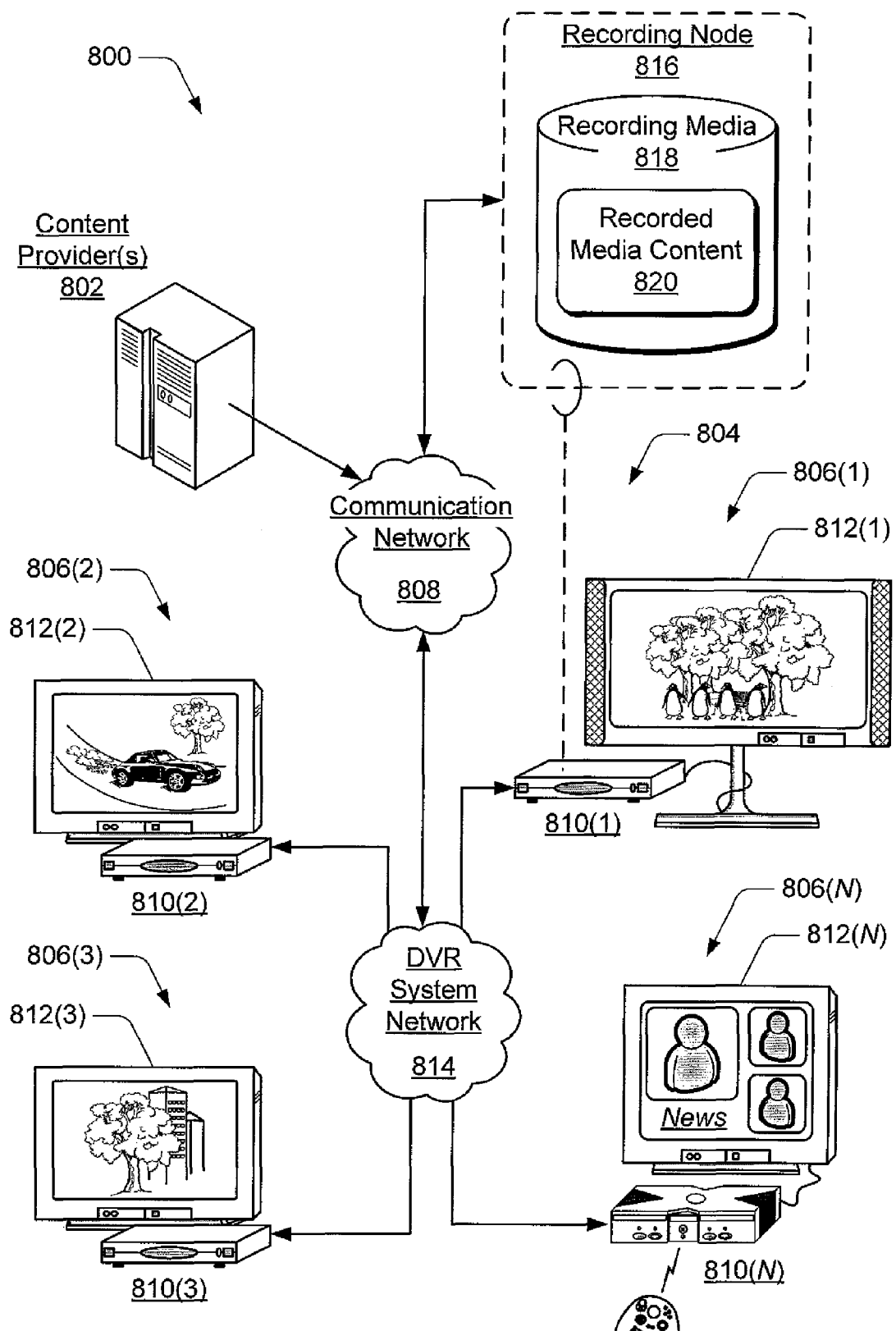
FIG. 8 is a pictorial diagram that illustrates an exemplary IP-based television (IPTV) system in which embodiments of determining user interest based on guide navigation can be implemented.

FIG. 8 illustrates an exemplary IP-based television (IPTV) environment 800 in which embodiments of determining user interest based on guide navigation can be implemented. The IPTV environment 800 includes content provider(s) 802 and a multi-DVR system 804 that can include any number of television-based client systems 806(1-N). The multi-DVR system 804 can represent a household viewing system that has several viewing areas, such as different rooms, for viewing television programs. The multi-DVR system 804 is configured for communication with any number of the different content provider(s) 802 via a communication network 808 which, in this example, is an IP-based network. Any of the systems and/or devices can be configured for network access in any number of embodiments and varieties of implementation.

The television-based client systems 806(1-N) of the multi-DVR system 804 are representative of DVR nodes in a multi-DVR system. Each of the DVR nodes of the multi-DVR system 804 can communicate with each other to act and make decisions on behalf of the other nodes, for the overall common good of the multi-DVR system 804, and based on the state of individual nodes and/or based on the state of the multi-DVR system 804.

The television-based client system 806(1) includes a television-based client device 810(1) and a display device 812(1), such as any type of television, monitor, LCD, or similar television-based display system that together renders audio, video, and/or image data. Similarly, the television-based client systems 806(2-N) each include a respective television-based client device 810(2-N) and a respective display device 812(2-N). Each television-based client device 810 can be implemented in any number of embodiments, such as a television-based set-top box, a digital video recorder (DVR) and playback system, an appliance device, a gaming system such as client device 810(N), and as any other type of client device that may be implemented in a television-based entertainment and information system.

The television-based client devices 810(1-N) of the television-based client systems 806(1-N) can be implemented for communication with each other via a DVR system network 814, and may be implemented with any number and combination of differing components as further described below with reference to the exemplary client device shown in FIG. 9. Further, the IPTV environment 800 may be implemented with any number and combination of differing components as described below with reference to the exemplary entertainment and information system shown in FIG. 10.

A television-based client system 806 at a node of the multi-DVR system 804 can receive programs, associated program content, various forms of media content, program guide data, advertising content, and other types of media content from content server(s) of the content provider(s) 802 via the communication network 808. Media content can include television-based programs (or programming) which may be any form of programs, commercials, music, movies, and video on-demand programs. Other media content can include recorded media content, interactive games, network-based applications, and any other similar audio, video, and/or image content. In addition, media content in general may include music streamed from a computing device to a client device, such as a television-based set-top box, and may also include video on-demand media content delivered from a server, a photo slideshow, and any other audio, video, and/or image content received from any type of media content source.

Although the data streams are not shown specifically, the arrowed communication links illustrate various data communication links which include the data streams. Additionally, the arrowed communication links are not intended to be interpreted as a one-way communication link from the DVR system network 814 to a client device 810(1), for example. It is contemplated that any one or more of the arrowed communication links can facilitate two-way data communication, such as from communication network 808 to a content provider 802.

The multi-DVR system 804 includes a recording node 816 which includes a recording media 818 to maintain recorded media content 820. In an embodiment, any one or more of the television-based client devices 810(1-N) in the multi-DVR system 804 can be implemented as the recording node 816 (as shown by the dashed line) which includes the recording media 818 to record media content received from a content provider 802. Alternatively (or in addition), a recording node of the multi-DVR system 804 can be implemented as a network-based recording node that the multi-DVR system 804 can communicate with via the communication network 808. In another implementation, the recording node 816 can be an independent component of the multi-DVR system 804.

The recording node 816 can record media content with the recording media 818 for any one or more of the television-based client devices 810(1-N) of the multi-DVR system 804. For example, a television-based client device 810 can initiate a record request to have media content recorded for a scheduled recording or to record and provide a pause buffer for the television-based client device. The recording node 816 can receive the record request and record the media content such that the television-based client device can access and render the recorded media content from the recording node via the DVR system network 814 and/or the communication network 808.

Figure 9:
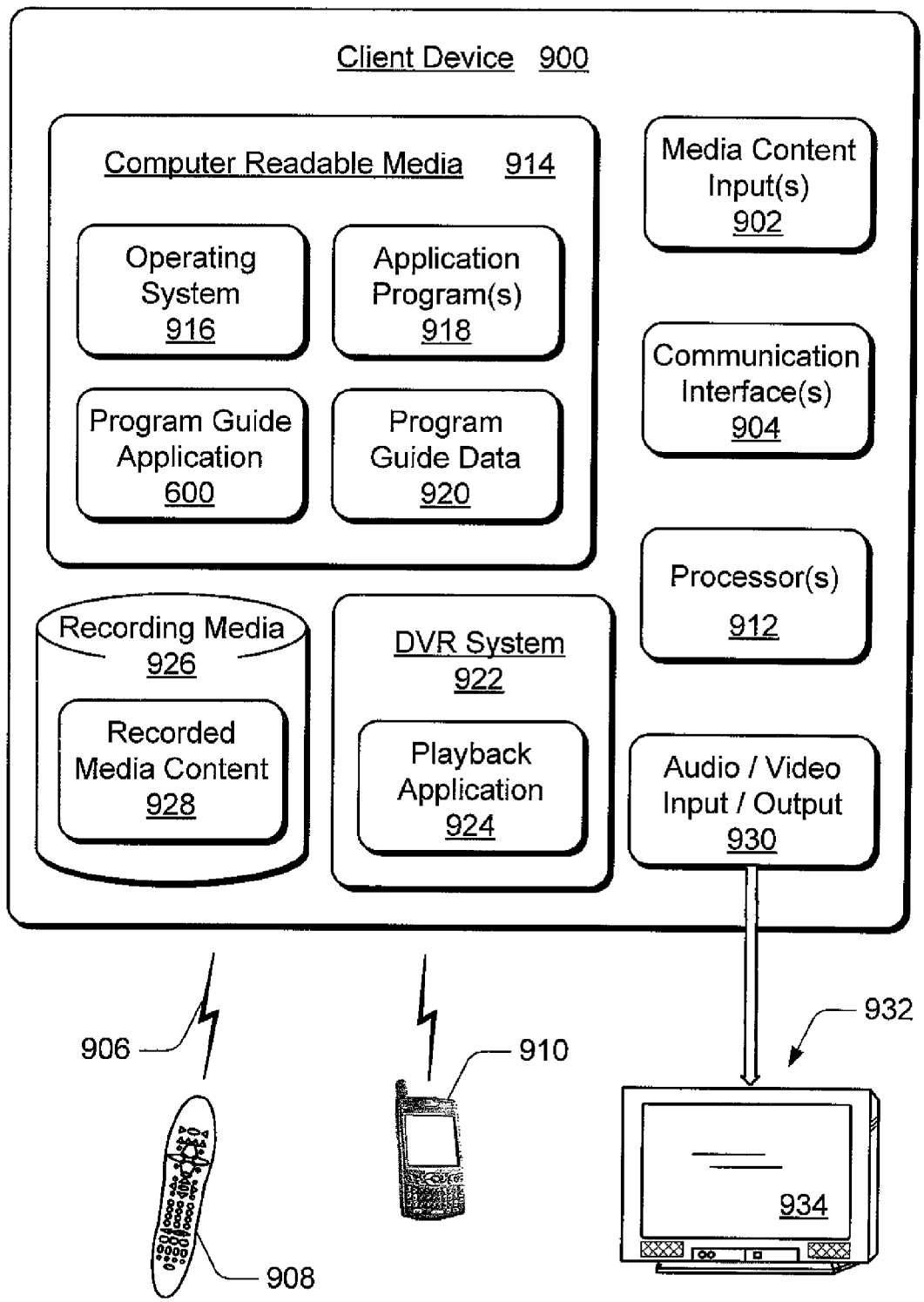
FIG. 9 is a block diagram that illustrates various components of an exemplary client device in which embodiments of determining user interest based on guide navigation can be implemented.

FIG. 9 illustrates various components of an exemplary client device 900 which can be implemented as any form of a computing, electronic, or television-based client device in which embodiments of determining user interest based on guide navigation can be implemented. For example, the client device 900 can be implemented as a television-based client device at a DVR node of the multi-DVR system shown in FIG. 8.

Client device 900 includes one or more media content inputs 902 which may include Internet Protocol (IP) inputs over which streams of media content are received via an IP-based network. Device 900 further includes communication interface(s) 904 which can be implemented as any one or more of a serial and/or parallel interface, a wireless interface, any type of network interface, a modem, and as any other type of communication interface. A wireless interface enables client device 900 to receive control input commands 906 and other information from an input device, such as from remote control device 908, a portable computing-based device (such as a cellular phone) 910, or from another infrared (IR), 802.11, Bluetooth, or similar RF input device.

A network interface provides a connection between the client device 900 and a communication network by which other electronic and computing devices can communicate data with device 900. Similarly, a serial and/or parallel interface provides for data communication directly between client device 900 and the other electronic or computing devices. A modem facilitates client device 900 communication with other electronic and computing devices via a conventional telephone line, a DSL connection, cable, and/or other type of connection.

Client device 900 also includes one or more processors 912 (e.g., any of microprocessors, controllers, and the like) which process various computer executable instructions to control the operation of device 900, to communicate with other electronic and computing devices, and to implement embodiments of multi-DVR node communication. Client device 900 can be implemented with computer readable media 914, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 914 provides data storage mechanisms to store various information and/or data such as software applications and any other types of information and data related to operational aspects of client device 900. For example, an operating system 916 and/or other application programs 918 can be maintained as software applications with the computer readable media 914 and executed on processor(s) 912 to implement embodiments of multi-DVR node communication.

For example, client device 900 can be implemented to include a program guide application 600 that is implemented to process program guide data 920 and generate program guides for display which enable a viewer to navigate through an onscreen display and locate broadcast programs, recorded programs, video on-demand programs and movies, interactive game selections, network-based applications, and other media access information or content of interest to the viewer.

The client device 900 can also include a DVR system 922 with playback application 924, and recording media 926 to maintain recorded media content 928 which may be any form of on-demand and/or media content such as programs, movies, commercials, music, and similar audio, video, and/or image content that client device 900 receives and/or records. Further, client device 900 may access or receive additional recorded media content that is maintained with a remote data store (not shown), such as from a video-on-demand server, or media content that is maintained at a broadcast center or content provider that distributes the media content to subscriber sites and client devices. The playback application 924 is a video control application that can be implemented to control the playback of media content, the recorded media content 928, and or other video on-demand media content, music, and any other audio, video, and/or image media content which can be rendered and/or displayed for viewing.

The client device 900 also includes an audio and/or video output 930 that provides audio and video to an audio rendering and/or display system 932, or to other devices that process, display, and/or otherwise render audio, video, and image data. Video signals and audio signals can be communicated from device 900 to a display device 934 via an RE (radio frequency) link, S-video link, composite video link, component video link, analog audio connection, or other similar communication link. Alternatively, the audio rendering and/or display system 932 is/are integrated components of the exemplary client device 900.

Figure 10:
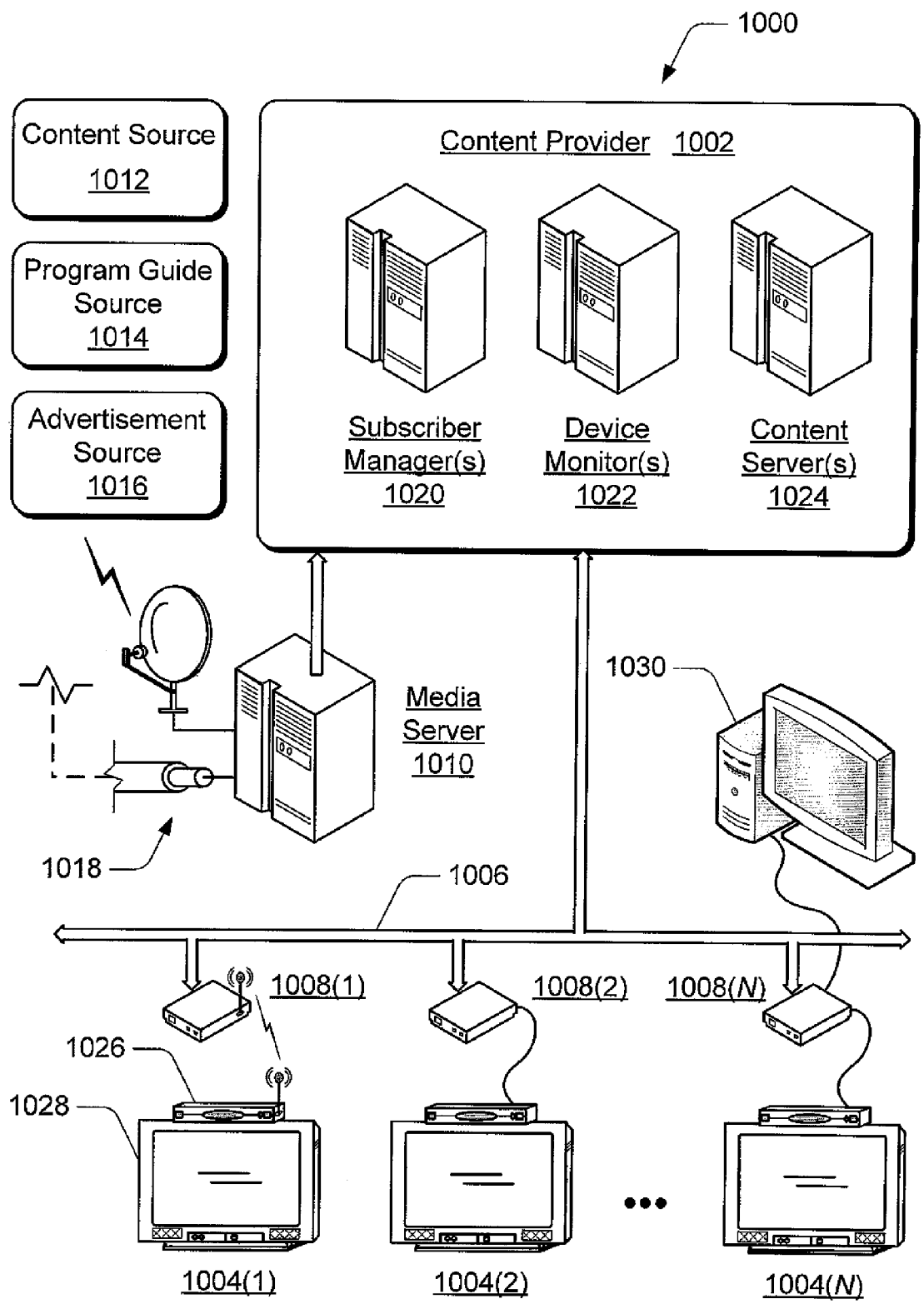
FIG. 10 is a block diagram that illustrates various devices and components in an exemplary entertainment and information system in which embodiments of determining user interest based on guide navigation can be implemented.

FIG. 10 illustrates an exemplary entertainment and information system 1000 in which an IP-based television environment can be implemented, and in which embodiments of determining user interest based on guide navigation can be implemented. System 1000 facilitates the distribution of media content, program guide data, and advertising content to multiple viewers and to multiple viewing systems. System 1000 includes a content provider 1002 and television-based client systems 1004(1-N) each configured for communication via an IP-based network 1006. Each television-based client system 1004(1-N) is an example of the television-based client systems 806(1-N) described with reference to FIG. 8. Each of the television-based client systems 1004(1-N) can receive one or more data streams from content provider 1002 which are then distributed to one or more other television-based client devices at DVR nodes of a multi-DVR system.

The network 1006 can be implemented as a wide area network (e.g., the Internet), an intranet, a Digital Subscriber Line (DSL) network infrastructure, or as a point-to-point coupling infrastructure. Additionally, network 1006 can be implemented using any type of network topology and any network communication protocol, and can be represented or otherwise implemented as a combination of two or more networks. A digital network can include various hardwired and/or wireless links 1008(1-N), routers, gateways, and so on to facilitate communication between content provider 1002 and the client systems 1004(1-N). The television-based client systems 1004(1-N) receive media content, program content, program guide data, advertising content, closed captions data, and the like from content server(s) of the content provider 1002 via the IP-based network 1006.

System 1000 includes a media server 1010 that receives media content from a content source 1012, program guide data from a program guide source 1014, and advertising content from an advertisement source 1016. In an embodiment, the media server 1010 represents an acquisition server that receives the audio and video media content from content source 1012, an EPG server that receives the program guide data from program guide source 1014, and/or an advertising management server that receives the advertising content from the advertisement source 1016.

The content source 1012, the program guide source 1014, and the advertisement source 1016 control distribution of the media content, the program guide data, and the advertising content to the media server 1010 and/or to other television-based servers. The media content, program guide data, and advertising content is distributed via various transmission media 1018, such as satellite transmission, radio frequency transmission, cable transmission, and/or via any number of other wired or wireless transmission media. In this example, media server 1010 is shown as an independent component of system 1000 that communicates the program content, program guide data, and advertising content to content provider 1002. In an alternate implementation, media server 1010 can be implemented as a component of content provider 1002.

Content provider 1002 is representative of a headend service in a television-based content distribution system, for example, that provides the media content, program guide data, and advertising content to multiple subscribers (e.g., the television-based client systems 1004(1-N)). The content provider 1002 can be implemented as a satellite operator, a network television operator, a cable operator, and the like to control distribution of media content, program and advertising content, such as movies, television programs, commercials, music, and other audio, video, and/or image content to the client systems 1004(1-N).

Content provider 1002 includes various components to facilitate media data processing and content distribution, such as a subscriber manager 1020, a device monitor 1022, and a content server 1024. The subscriber manager 1020 manages subscriber data, and the device monitor 1022 monitors the client systems 1004(1-N) (e.g., and the subscribers), and maintains monitored client state information.

Although the various managers, servers, and monitors of content provider 1002 (to include the media server 1010 in one embodiment) are illustrated and described as distributed, independent components of content provider 1002, any one or more of the managers, servers, and monitors can be implemented together as a multi-functional component of content provider 1002. Additionally, any one or more of the managers, servers, and monitors described with reference to system 1000 can implement features and embodiments of multi-DVR node communication.

The television-based client systems 1004(1-N) can be implemented to include a television-based client device 1026 and a display device 1028 (e.g., a television, LCD, and the like). A television-based client device 1026 of a television-based client system 1004 can be implemented in any number of embodiments, such as a set-top box, a digital video recorder (DVR) and playback system, an appliance device, a gaming system, and as any other type of client device that may be implemented in a television-based entertainment and information system. In an alternate embodiment, client system 1004(N) is implemented with a computing device 1030 as well as a television-based client device 1026. Additionally, any of the television-based client devices 1026 of a television-based client system 1004 can implement features and embodiments of multi-DVR node communication as described herein.

Although embodiments of determining user interest based on guide navigation have been described in language specific to features and/or methods, it is to be understood that the subject of the appended claims is not necessarily limited to the specific features or methods described. Rather, the specific features and methods are disclosed as exemplary implementations of determining user interest based on guide navigation.

The invention claimed is:

1. A method comprising:
rendering an electronic program guide (EPG), the EPG comprising:
a program listing of multiple programs;
a program indicator that indicates a particular program in the program listing; and
a details area comprising a picture-in-picture (PIP) window in which additional data is displayed concurrently with the program listing of multiple programs;
determining a first program that is represented by a program listing currently indicated by the program indicator;
providing detailed data associated with the first program as the additional data displayed in the details area;
receiving a navigation command;
responsive to receiving the navigation command, modifying the program indicator to indicate a second program in the program listing;
automatically determining, based on the navigation command, whether or not a user is likely to be interested in the second program;
when the navigation command comprises an up arrow command, a down arrow command, a left arrow command or a right arrow command, indicating a user request to navigate to a program listing that is adjacent to the program listing of the first program, determining that the user is likely to be interested in the second program;
when the navigation command comprises a page up command, a page down command, a page right command, or a page left command, indicating a user request to navigate to a program listing that is not adjacent to the program listing of the first program, determining that the user is not likely to be interested in the second program;
responsive to determining that the user is likely interested in the second program, displaying detailed data associated with the second program as the additional data displayed in the details area of the EPG; and
responsive to determining that the user is likely not interested in the second program, displaying data that is targeted to the user in the details area of the EPG, the data that is targeted to the user not being associated with the second program and being displayed in the details area instead of the detailed data associated with the second program.

2. The method as recited in claim 1, wherein the detailed data associated with the second program comprises a broadcast of the second program.

3. The method as recited in claim 1, wherein the detailed data associated with the second program comprises a preview of the second program.

4. The method as recited in claim 1, wherein the detailed data associated with the second program comprises at least one of a textual description of the second program, a rating of the second program, or a duration of the second program.

5. The method as recited in claim 1, wherein the data that is targeted to the user comprises a product advertisement.

6. The method as recited in claim 1, wherein the data that is targeted to the user comprises a program advertisement selected based on a type of programming corresponding to the first program.

7. The method as recited in claim 1, wherein the data that is targeted to the user comprises a channel promotion.

8. The method as recited in claim 1, wherein, the data that is targeted to the user comprises an on-demand program promotion.

9. The method as recited in claim 1, wherein, the data that is targeted to the user is targeted to the user based on demographic data associated with the user.

10. The method as recited in claim 1, wherein, the data that is targeted to the user is targeted to the user based on a location within the program listing associated with the second program.

11. The method as recited in claim 1, wherein, the data that is targeted to the user is targeted to the user based on a channel band that includes a channel over which the second program is available.

12. The method as recited in claim 1, further comprising, when the navigation command is a page left or page right command, the data that is targeted to the user is targeted to the user based on a channel over which the first program is available.

13. A system comprising:
a processor;
a memory; and
a program guide application stored in the memory and executed on the processor, the program guide application configured to:
display a grid of programs available to a user and a details region displayed concurrently with the grid;
indicate a program in the grid of programs;
automatically determine, based on a user-submitted navigation command that resulted in the program being indicated, whether the user is likely interested in the program;
responsive to determining that the user is likely interested in the program, while the program is indicated, present detailed data associated with the program in the details region displayed concurrently with the grid; and
responsive to determining that the user is likely not interested in the program, while the program is indicated, present alternate data to the user in the details region displayed concurrently with the grid, instead of presenting the detailed data associated with the program.

14. The system as recited in claim 13, wherein the program guide application comprises:
a rendering module to render a graphical representation of electronic program guide data;
a command interface to receive user-submitted commands; and
a user interest detection module to automatically determine whether a user is likely interested in a currently indicated program.

15. The system as recited in claim 14, wherein the program guide application further comprises a picture-in-picture video module to determine, according to whether the user is likely interested in the indicated program, content to be rendered in a PIP window included in the details region.

16. One or more computer-readable media, where the media is not a signal, comprising computer-executable instructions that, when executed, cause a computing system to perform a method, the method comprising:
rendering an arrangement of representations of a plurality of available media programs, the arrangement comprising a details portion for display in conjunction with the representations of the plurality of available media programs;
indicating a representation of a first program of the plurality of available media programs;
identifying detailed data associated with the first program;

automatically determining, based on a user-submitted navigation command that resulted in the representation of the first program being indicated, whether or not a user is likely interested in the first program;

responsive to determining that the user is likely interested in the first program, while continuing to indicate the representation of the first program, rendering the detailed data associated with the first program for display in the details portion of the arrangement; and responsive to determining that the user is likely not interested in the first program, while continuing to indicate the representation of the first program, instead of rendering the detailed data associated with the first program, rendering alternate data not associated with the first program for display in the details portion of the arrangement.

17. The one or more computer-readable media as recited in claim 16, wherein the alternate data not associated with the first program comprises data targeted to the user.

* * * * *